United States Patent [19]

Patercsak

[11] Patent Number: 5,538,281
[45] Date of Patent: Jul. 23, 1996

US005538281A

[54] FOLDED AIR BAG

[75] Inventor: Patrick E. Patercsak, St. Clair Shores, Mich.

[73] Assignee: TRW Vehicle Safety Systems Inc., Lyndhurst, Ohio

[21] Appl. No.: 414,506

[22] Filed: Mar. 31, 1995

[51] Int. Cl.⁶ .................................................. B60R 21/20
[52] U.S. Cl. .................................................. 280/743.1
[58] Field of Search ........................... 280/743.10, 728.1; 493/243

[56] References Cited

U.S. PATENT DOCUMENTS

| | | | |
|---|---|---|---|
| 5,022,675 | 6/1991 | Zelenak, Jr. et al. | 280/743.1 |
| 5,140,799 | 8/1992 | Satoh | 280/743.1 X |
| 5,162,035 | 10/1992 | Baker | 280/743.1 X |
| 5,290,061 | 3/1994 | Bollaert | 280/743.1 |
| 5,324,070 | 6/1994 | Kitagawa et al. | 280/743.1 X |
| 5,348,341 | 9/1994 | Webber | 280/728.1 |
| 5,382,048 | 1/1995 | Paxton et al. | 280/728 R |
| 5,419,579 | 5/1995 | McPherson et al. | 280/743.1 |
| 5,425,551 | 6/1995 | Hawthorn | 280/743.1 |

Primary Examiner—Christopher P. Ellis
Attorney, Agent, or Firm—Tarolli, Sundheim, Covell, Tummino & Szabo

[57] ABSTRACT

An inflatable air bag (10) for restraining an occupant (12) of a vehicle (14) has a deflated condition and an inflated condition. The air bag (10) has layers (20, 22) defining between them an inflation volume into which gas is directed to inflate the air bag. The air bag (10) includes a retainer (80) which defines an inflation fluid opening (82). First and second parts (110, 120) of the air bag (10) on opposite sides of the inflation fluid opening (82) are separately rolled into compact shapes disposed at least partially in the retainer (80).

15 Claims, 4 Drawing Sheets

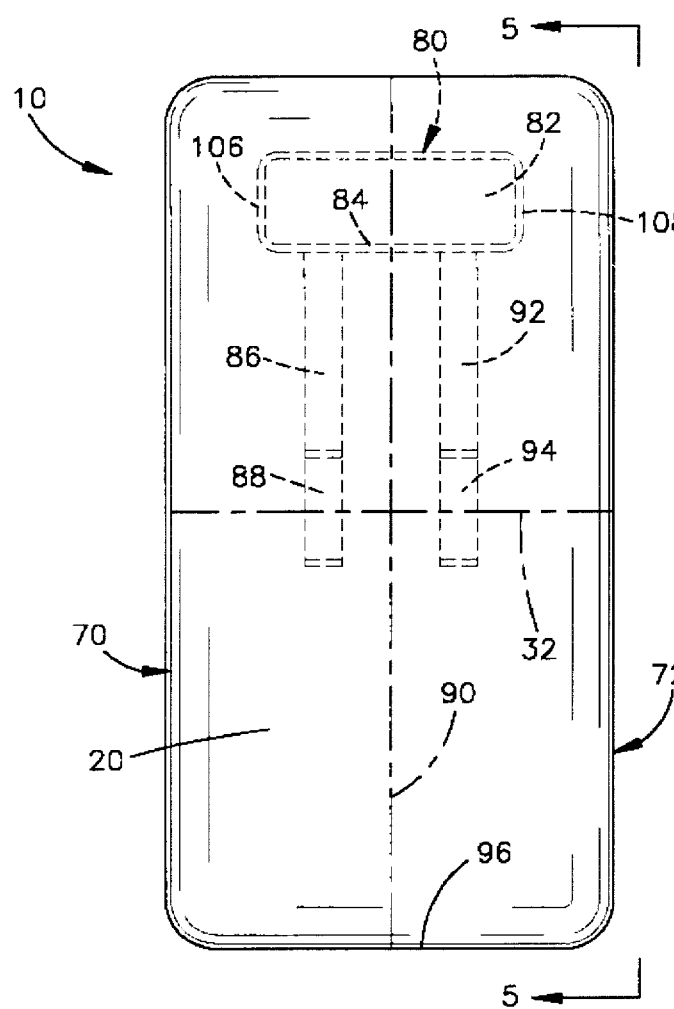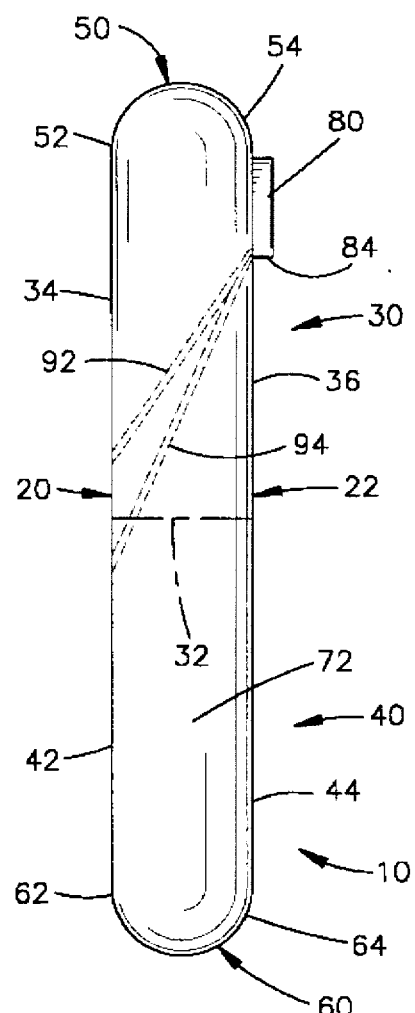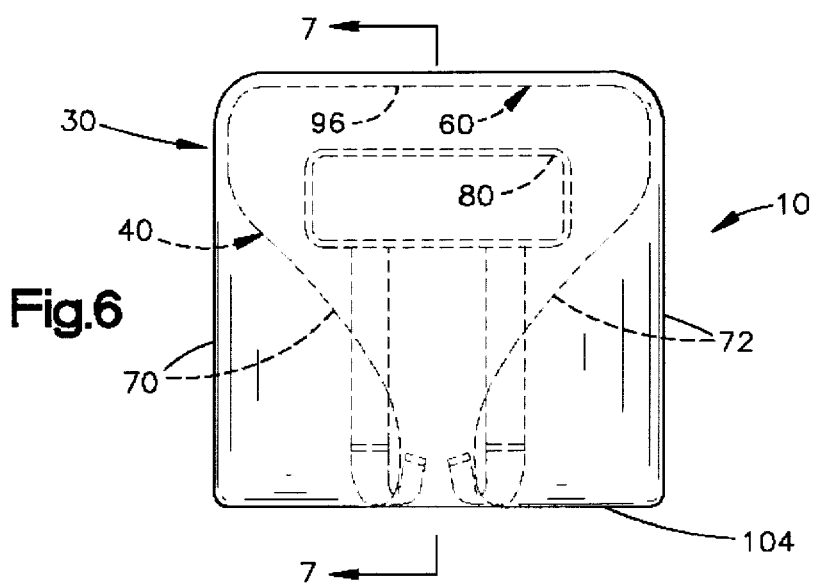

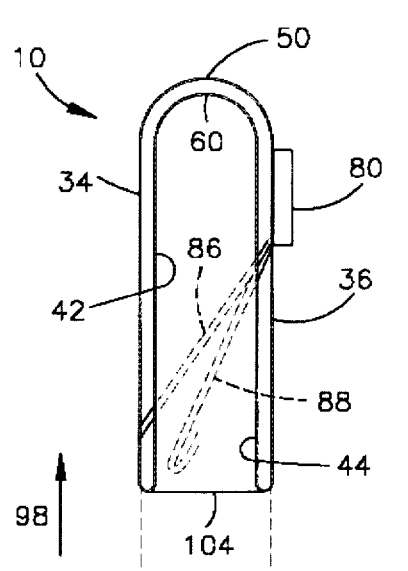
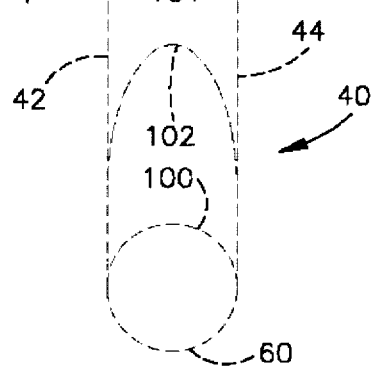
Fig.7
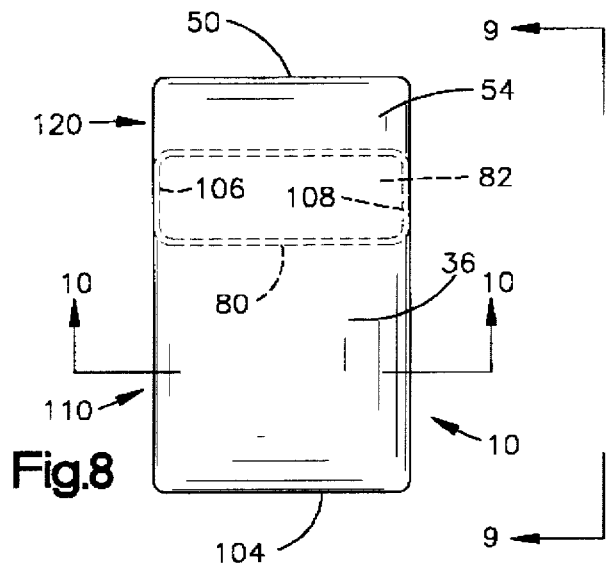
Fig.8
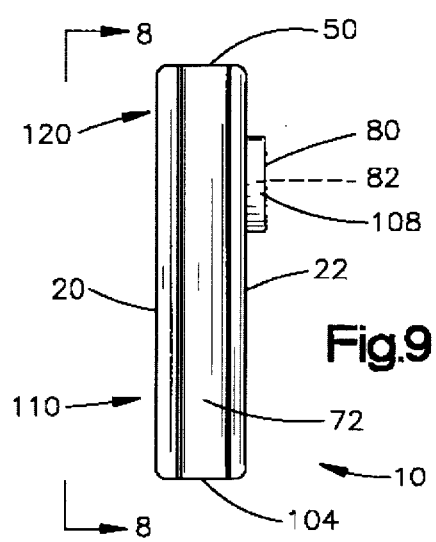
Fig.9
Fig.10   Fig.11   Fig.12

5,538,281

1

FOLDED AIR BAG

BACKGROUND OF THE INVENTION

The present invention relates to an air bag which is inflatable to protect an occupant of a vehicle during a collision.

DESCRIPTION OF THE PRIOR ART

An air bag for protecting an occupant of a vehicle is typically folded and supported in the instrument panel or steering wheel of the vehicle. An inflator assembly is actuated to direct high pressure gas into the air bag to inflate the air bag. The air bag, when inflated, protects the vehicle occupant during sudden vehicle deceleration such as occurs in a collision.

It is preferable that an air bag, when inflating, not brush against the head or upper torso of a vehicle occupant. This is especially desirable if the vehicle occupant is not close to or against the vehicle seat back when the inflator assembly is actuated.

SUMMARY OF THE INVENTION

The present invention is an inflatable air bag for, when inflated, protecting an occupant of a vehicle. The air bag has a deflated condition and an inflated condition. The air bag has a retainer defining an inflation fluid opening though which inflation fluid is directed to inflate the air bag from the deflated condition to the inflated condition. A first part of the air bag has a first condition disposed on one side of the inflation fluid opening and a second condition rolled into a second compact shape at least partially disposed within the retainer. A second part of the air bag has a first condition disposed on an opposite side of the inflation fluid opening and a second condition rolled into a second compact shape at least partially disposed within the retainer adjacent to the rolled first part of the air bag.

BRIEF DESCRIPTION OF THE DRAWINGS

The foregoing and other features of the present invention will become apparent to one of ordinary skill in the art to which the present invention relates upon consideration of the following description of the invention with reference to the accompanying drawings, wherein:

FIG. 4 is a front elevational view of the air bag of FIG. 1 in a deflated and unfolded condition;

FIG. 5 is a side elevational view of the air bag of FIG. 4 as viewed along line 5—5 of FIG. 4;

FIG. 6 is a schematic illustration of the air bag of FIG. 4 after an initial fold of a lower section of the air bag upward into an upper section of the air bag;

FIG. 7 is a schematic sectional view of the partially folded air bag of FIG. 6, taken along line 7—7 of FIG. 6;

FIG. 8 is a front elevational view of the air bag of FIG. 6 after folding of the sides of the air bag;

FIG. 9 is a side elevational view of the air bag of FIG. 8 as viewed along line 9—9 of FIG. 8;

FIG. 10 is a sectional view taken along line 10—10 of FIG. 8 and further illustrating the folded sides of the air bag;

2

FIGS. 11 and 12 are views similar to FIG. 10 illustrating alternate ways of folding the sides of the air bag; and FIGS. 13 through 16 are a series of views illustrating schematically the final rolling of parts of the air bag prior to placement of the air bag in the vehicle.

DESCRIPTION OF PREFERRED EMBODIMENT OF THE INVENTION

Figure 1:
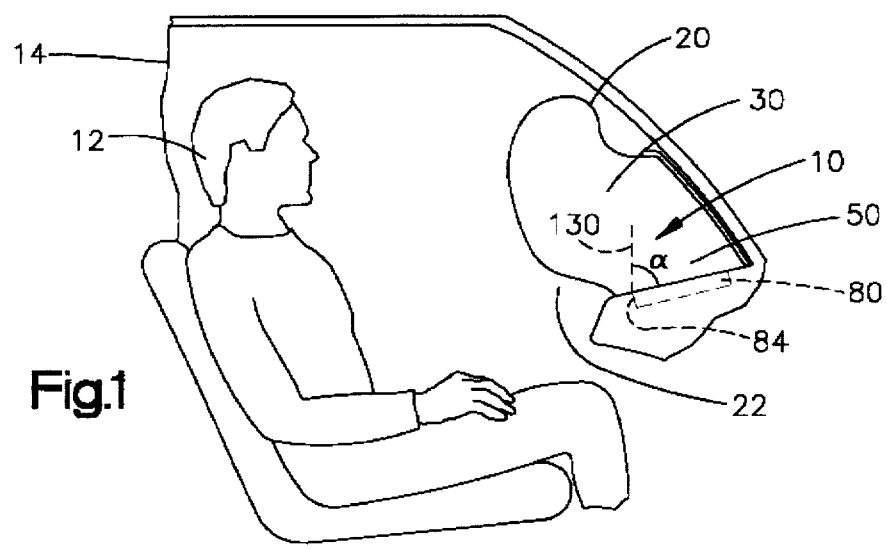
FIGS. 1 through 3 are a series of schematic views illustrating an air bag in accordance with the present invention inflating in a vehicle.

The present invention relates to an air bag for protecting an occupant of a vehicle in the event of sudden vehicle deceleration such as occurs in a collision. The present invention is applicable to various air bag constructions. As representative of the present invention, FIG. 1 illustrates an air bag 10. The air bag 10 is for protection of an occupant 12 of a vehicle 14 by restraining movement of the occupant in a direction toward the front of the vehicle, that is, to the right as viewed in FIG. 1.

The air bag 10 (FIGS. 4 and 5) includes two layers of a material (preferably a fabric such as woven nylon) which define between them an inflation volume into which an inflation fluid, such as a gas, is directed to inflate the air bag. The two layers include a front panel 20, which is disposed closest to the vehicle occupant 12 when the air 10 bag 10 is inflated, and a back panel 22, which is disposed farthest from the vehicle occupant when the air bag is inflated. The front and back panels 20 and 22 may be separate fabric pieces sewn together, or may be formed as one piece of fabric.

The air bag 10 has an upper section 30 located above (as viewed in FIGS. 4 and 5) an imaginary horizontal midline 32 of the air bag. The air bag upper section 30 includes an upper portion 34 of the front panel 20 and an upper portion 36 of the back panel 22. The air bag 10 has a lower section 40 located below (as viewed in FIGS. 4 and 5) the midline 32. The air bag lower section 40 includes a lower portion 42 of the front panel 20 and a lower portion 44 of the back panel 22.

An upper end portion 50 of the air bag 10 includes upper end portions 52 and 54 of the front and back panels 20 and 22, respectively. A lower end portion 60 of the air bag 10 includes lower end portions 62 and 64 of the front and back panels 20 and 22, respectively. The air bag 10 has a left side section 70 and a right side section 72 located on the left and right sides, respectively, (as viewed in FIG. 4) of an imaginary vertical midline 90 of the air bag 10.

The air bag 10 includes a retaining ring or retainer 80 secured to and extending outward from the back panel 22. When the air bag 10 is mounted in the vehicle 14, the retainer 80 is coupled to an air bag inflator assembly (not shown) on the vehicle 14 to secure the air bag 10 to the inflator assembly. The retainer 80 defines an inflation fluid opening 82 in the back panel 22 through which inflation fluid such as gas from the inflator assembly is directed to inflate the air bag 10. The retainer 80 is preferably a known box-shaped metal member which has a circumference large enough to contain substantially all the fabric material of the air bag 10 when the air bag is in a folded and stored condition.

A plurality of internal tethers extend inside the air bag 10 from the back panel 22, at the lower side 84 of the retainer 80, to the front panel 20. A left upper tether 86 and a left lower tether 88 are located to the left (as viewed in FIG. 4) of the imaginary vertical midline 90 of the air bag 10. A right upper tether 92 and a right lower tether 94 are located to the right (as viewed in FIG. 4) of the imaginary vertical midline 90.

For mounting in the vehicle 14, the air bag 10 is first folded from the deflated, unfolded condition shown in FIGS. 4 and 5 into the deflated, folded condition shown in FIGS. 8 and 9. The air bag 10 is then rolled from the deflated, folded condition shown in FIGS. 8 and 9 into the rolled condition shown in FIG. 16.

The initial fold of the air bag 10 is illustrated in FIGS. 6 and 7. In this initial fold, the lower section 40 of the air bag 10 is, in effect, turned "inside out" and 10 folded up ("tucked up") inside the upper section 30 of the air bag. To fold the air bag 10 in this manner, the air bag lower end portion 60 is moved upwardly, in a direction as indicated by the arrow 98 (FIG. 7), inside the inflation volume between the front panel 20 and the back panel 22. The lower end portion 60 is moved upward as shown schematically in FIG. 7, past the intermediate positions illustrated by the dashed lines 100 and then 102, until the lower end portion is adjacent the upper end portion 50, as shown in solid lines in FIG. 7. While the air bag lower end portion 60 is being moved upward, it passes between the left tethers 86 and 88 on one side and the right tethers 92 and 94 on the other side. When the air bag lower end portion 60 is adjacent the upper end portion 50, the material of the lower end portion is then spread out sideways as much as possible along the upper end portion.

This initial tuck fold can be described in another way with reference to folding the air bag 10 by hand (it is preferred that the air bag 10 be folded by machine). If this initial tuck fold is done by hand, the mid-portion 96 of the air bag lower end portion 60 is grasped with one hand and pushed upwardly between the front panel 20 and the back panel 22, and between the left tethers 86 and 88 on one side and the right tethers 92 and 94 on the other side. The lower end portion 60 is pushed upward until it is adjacent the upper end portion 50. Then, both hands are inserted into the air bag 10 and moved sideways apart from each other, so that the air bag lower end portion 60 is spread out sideways as much as possible along the upper end portion 50.

When this initial tuck fold is completed, the air bag 10 is in the partially folded condition shown in FIGS. 6 and 7. The air bag lower section 40 is turned inside out and is located inside the air bag upper section 30. The lower portion 44 of the back panel 22 and the lower portion 42 of the front panel 20 are received between the upper portion 36 of the back panel 22 and the upper portion 34 of the front panel 20. The panel upper portions 36 and 34 form the upper section 30 of the air bag 10 when the air bag is inflated. The panel lower portions 44 and 42 form the lower section 40 of the air bag 10 when the air bag is inflated. In this partially folded condition, the height of the air bag 10, that is, the distance between the upper end portion 50 and the bottom portion 104 of the partially folded air bag, is about half that of the air bag prior to folding.

It should be understood that a folded air bag in accordance with the present invention need not have internal tethers such as the tethers 86, 88, 92 and 94. In such a case, the lower end portion 60 of the air bag 10 is more easily pushed directly into position adjacent the upper end portion 50.

The air bag side sections 70 and 72 are then folded inward toward the retainer 80 until the air bag is not wider than the retainer. The side sections 70 and 72 may be folded by pleating and rolling as indicated schematically in FIG. 10. Thus, the left side section 70 is folded inward until it does not extend outward of the left side 106 of the retainer 80. The right side section 72 is folded inward until it does not extend outward of the right side 108 of the retainer 80.

Alternatively, the side sections 70 and 72 may be folded by rolling, as indicated schematically in FIG. 11, or by pleating, as indicated schematically in FIG. 12.

When the side sections 70 and 72 of the air bag 10 are folded, the air bag is in the folded condition shown in FIGS. 8 and 9. In this condition, a first part 110 of the air bag 10 is disposed on one side of (below as viewed in FIGS. 8 and 9) the inflation fluid opening 82 and the retainer 80. A second part 120 of the air bag 10 is disposed on the opposite side of (above as viewed in FIGS. 8 and 9) the inflation fluid opening 82 and the retainer 80. It should be understood that the second part 120 of the air bag 10 typically is longer than as shown in FIGS. 8 and 9.

Figure 13:
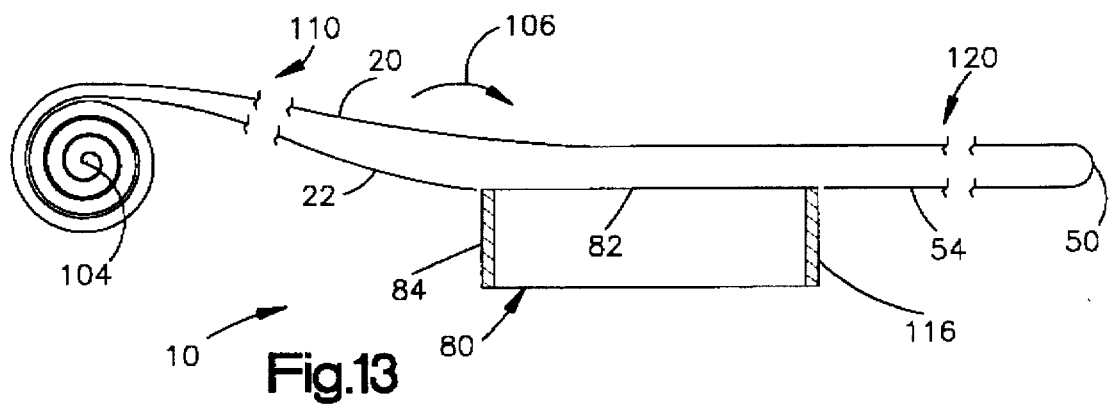
Figure 14:
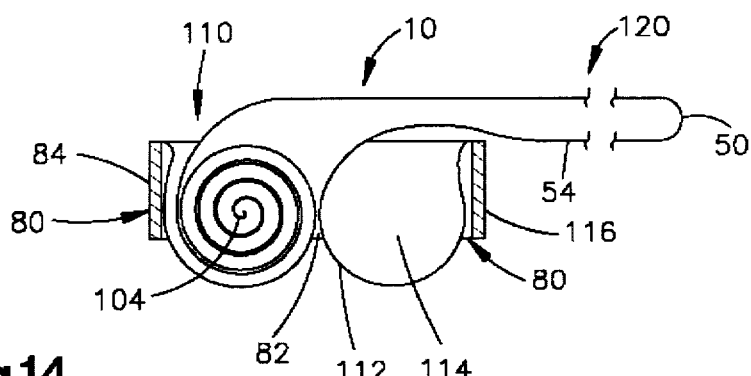
Figure 15:
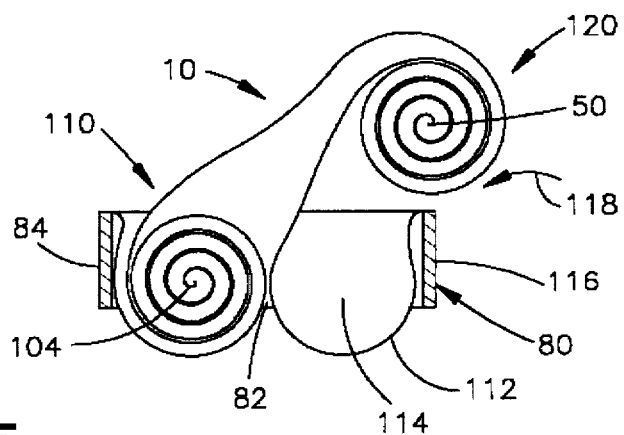

The air bag 10 is then rolled up as illustrated schematically in FIGS. 13–16. In the first step of this rolling process, the first part 110 of the partially folded air bag 10 is rolled up toward the retainer 80 as seen in FIG. 13. The bottom portion 104 of the air bag 10 is rolled up under the front and back panels 20 and 22 toward the retainer 80, rolling up the front and back panels 20 and 22, until the roll reaches the bottom side 84 of the retainer. The roll is then moved over the bottom side 84 of the retainer 80, in a direction as shown by the arrow 106 (FIG. 13), into a position inside the retainer 80 as shown in FIG. 14.

Next, a portion 112 (FIGS. 14–16) of the material of the second part 120 of the air bag 10, adjacent to the retainer 80, is moved into the retainer as shown in FIG. 14 to form a pocket 114. This portion 112 is part of the upper end portion 54 of the back panel 22. The second part 120 of the air bag 10 is thereafter rolled up as illustrated schematically in FIGS. 15 and 16. Specifically, the upper end portion 50 of the air bag 10 is turned down as viewed in FIG. 14 and the front and back panels 20 and 22 are rolled up toward the retainer 80, until the roll reaches the top side 116 of the retainer. The roll is then moved over the top side 116 of the retainer 80, in a direction as shown by the arrow 118 (FIG. 15), into a position inside the pocket 114 and inside the retainer 80 as shown in FIG. 16.

Figure 16:
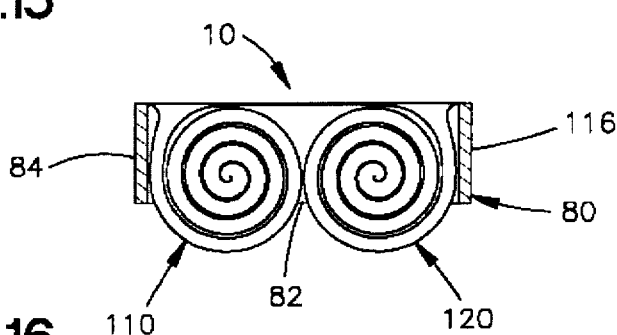

The air bag 10 is then in the condition shown in FIG. 16. The first part 110 of the air bag 10 is rolled into a compact shape which is disposed, at least partially, inside a first portion of the retainer 80. The second part 120 of the air bag 10 is rolled into a compact shape which is disposed, at least partially, inside a second portion of the retainer 80 and adjacent to the rolled first part 110. Rolling the second part 120 of the air bag 10 helps pack the air bag more securely in the retainer 80 to reduce shifting of the various portions of the air bag within the retainer. It is preferred that all or substantially all of the air bag 10 be disposed within the retainer 80 for mounting in the vehicle 14. It is contemplated, however, that some of the air bag 10 may extend out of the generally rectangular volume defined by the retainer 80 when the air bag is in the rolled condition shown in FIG. 16.

The air bag 10 is then secured to an inflator assembly and mounted in the vehicle 14, in a known manner. In the vehicle 14 illustrated in FIGS. 1–3, the retainer 80 with the folded air bag 10 inside it, is mounted to lie in a plane that is at an angle α (FIG. 1) of about 70° to 80° from an imaginary vertical line 130. The bottom side 84 of the retainer 80 is disposed closest to the vehicle occupant 12. This is generally referred to as a "top mount" configuration.

In the event of sudden vehicle deceleration such as occurs in a collision, an inflator assembly (not shown) in the vehicle 14 (FIG. 1) is actuated in a known manner to direct inflation fluid such as gas into the air bag 10 to inflate the air bag. The air bag 10 inflates toward the vehicle occupant 12, that is, toward the left as viewed in FIGS. 1–3.

The portion of the air bag 10 which inflates and unfolds first is the second part 120 which includes the upper end portion 50. The inflation fluid from the inflator assembly engages the material portion 112 to move the second part 120 of the air bag 10 out of the retainer 80 in an upward direction as viewed in FIG. 16. The second part 120 of the air bag 10 unrolls as it inflates, in a manner substantially the reverse of the rolling process shown in FIGS. 15 and 16. Placing the second part 120 of the air bag 10 in the rolled condition shown in FIG. 16, prior to inflation of the air bag, helps the upper end portion 50 to fill quickly in a bubble-like manner. Rolling the second part 120 of the air bag 10, in the manner shown in FIGS. 15–16, also helps provide a proper desired trajectory for the inflating air bag.

Next, the first part 110 of the air bag unrolls and the side sections 70 and 72 inflate and unfold. The internal tethers 86, 88, 92 and 94 help keep the air bag 10 from inflating upward toward the roof of the vehicle 12.

The air bag 10 is then in the partially inflated condition shown in FIG. 1. The upper section 30 of the air bag 10 is inflated and is generally in position in front of the head and upper torso of the vehicle occupant 12. The lower section 40 of the air bag 10 (not shown in FIG. 1) is still tucked or folded inside the upper section 30.

The air bag lower section 40 is the final part of the air bag 10 to inflate and unfold. Gas from the inflator assembly continues to be directed into the inflation volume between the air bag front panel 20 and the back panel 22. The lower end portion 60 (FIG. 7) of the air bag 10 moves down and away from its folded position adjacent the upper end portion 50. The lower section 40 (FIG. 1) of the air bag 10 comes out of the upper section 30, and the air bag 10 is in the inflated, unfolded condition shown in FIG. 3. The tuck fold, i.e., the fold of the air bag lower section 40 up into the upper section 30 as shown in FIGS. 6 and 7, is the last to unfold. The lower section 40 of the air bag 10 is the last part of the bag to inflate.

Folding the lower section 40 of the air bag 10 and turning it inside out into the upper section 30, in the manner described above, limits the free length of the air bag 10 which reaches out towards the vehicle occupant 12 when the air bag inflates. The inflating air bag 10 extends out only about half the distance toward the vehicle occupant 12, then the lower section 40 pops out from the upper section 30 as shown. This tends to reduce the possibility that the air bag 10 may brush against the face or upper torso of the vehicle occupant 12 as the bag is inflating. This is especially advantageous if the vehicle occupant is out of position, i.e., is closer than desired to the air bag 10 when the air bag begins to inflate.

Figure 2:
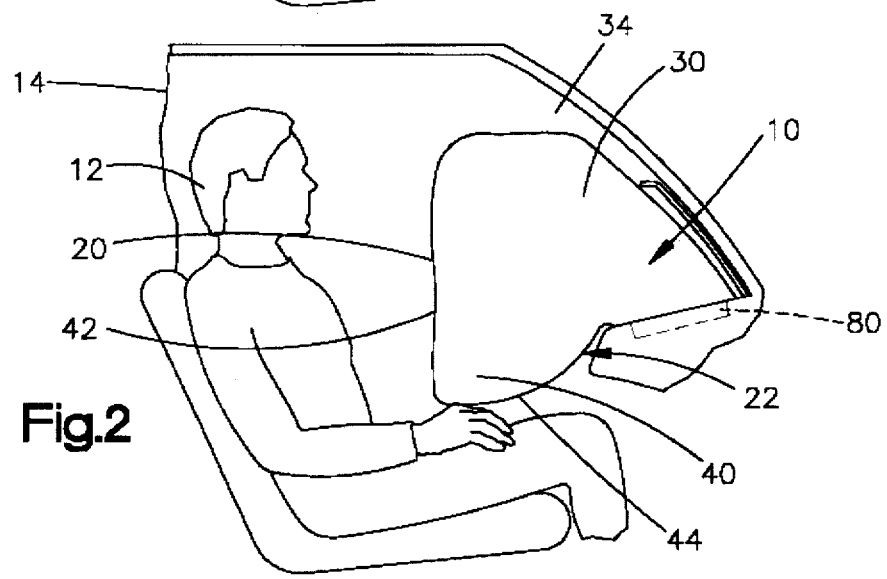
Figure 3:
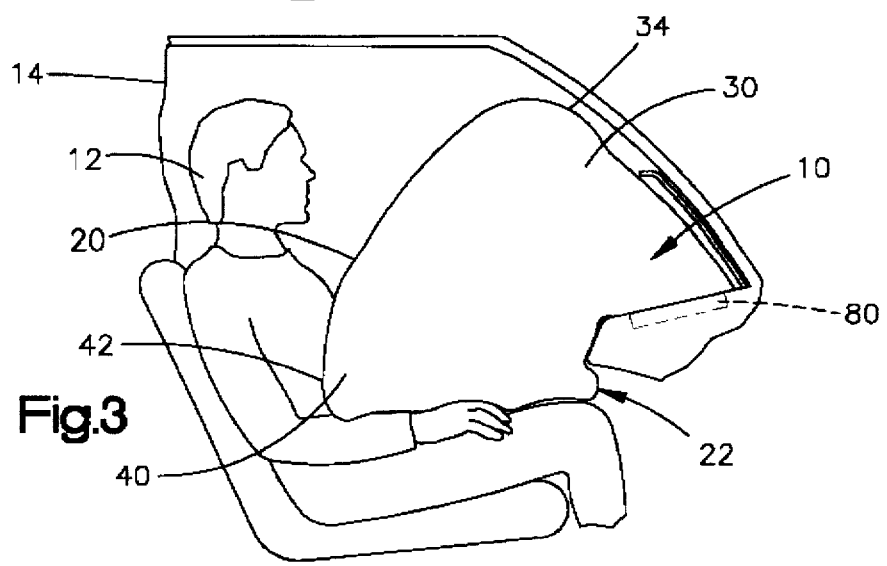

As illustrated in FIGS. 1–3, the air bag 10 is disposed in the vehicle 14 in a top mount configuration. It should be understood that the present invention is applicable to other mounting configurations as well, in which case the relative lengths of the first and second parts 110 and 120 of the air bag 10 could be different from those illustrated. It should further be understood that the invention is applicable to air bags which are not tuck folded in the manner illustrated in FIGS. 6 and 7.

From the above description of the invention, those skilled in the art will perceive improvements, changes and modifications in the invention. Such improvements, changes and modifications within the skill of the art are intended to be covered by the appended claims.

Having described the invention, I claim:

1. An air bag for, when inflated, protecting an occupant of a vehicle, said air bag having a deflated condition and an inflated condition, said air bag having a retainer defining an inflation fluid opening through which inflation fluid is directed to inflate said air bag from the deflated condition to the inflated condition, a first part of said air bag having a first condition in which said first part is disposed on a first side of said inflation fluid opening and a second condition in which said first part is rolled into a first compact shape at least partially disposed within said retainer, and a second part of said air bag having a first condition in which said second part is disposed on a second side of said inflation fluid opening opposite from said first side and a second condition in which said second part is rolled into a second compact shape at least partially disposed within said retainer adjacent to said rolled first part of said air bag;

wherein a portion of the material of said second part of said air bag, during movement of said second part from the first condition to the second condition, is moved into said retainer adjacent to said rolled first part of said air bag to form a pocket into which said rolled second part of said air bag is disposed.

2. An inflatable air bag as set forth in claim 1 wherein said second part of said air bag includes an upper end portion of said air bag.

3. An inflatable air bag as set forth in claim 1 wherein said retainer comprises a box-shaped metal member within which at least portions of said rolled first and second parts of said air bag are disposed when in the second condition, said box-shaped metal member being adapted to be connected with an inflation fluid source for mounting in the vehicle.

4. An inflatable air bag as set forth in claim 1 wherein the portion of said air bag which inflates first is said second part of said air bag, said second part of said air bag unrolling as it inflates, said first part of said air bag unrolling and inflating after said second part unrolls and inflates.

5. An inflatable air bag as set forth in claim 1 having upper and lower sections when in the inflated condition, said air bag when in the deflated condition having a first portion which is turned inside out and received inside a second portion of said air bag, said first portion of said air bag forming said lower section of said air bag when said air bag is in the inflated condition, said first portion of said air bag being the final portion of said air bag to inflate when said air bag is inflated, said air bag comprising a plurality of layers including a back panel disposed farthest from the vehicle occupant when said air bag is inflated and a front panel disposed closest to the vehicle occupant when said air bag is inflated, each of said back panel and said front panel having respective upper and lower portions, said upper portions of said back panel and of said front panel forming said upper section of said air bag when said air bag is inflated, said lower portions of said back panel and of said front panel forming said lower section of said air bag when said air bag is inflated, said first portion of said air bag including said lower portions of said back panel and of said front panel.

6. An air bag as set forth in claim 1 having upper and lower sections when in the inflated condition, said air bag when in the deflated condition having a first portion which is turned inside out and received inside a second portion of said air bag, said first portion of said air bag forming said lower section of said air bag when said air bag is in the inflated condition, said first portion of said air bag being the final portion of said air bag to inflate when said air bag is inflated, each of said upper and lower sections of said air bag having side sections folded inward toward said retainer.

7. An inflatable air bag for, when inflated, protecting an occupant of a vehicle, said air bag having a deflated condition and an inflated condition, said air bag when in the inflated condition having upper and lower sections, said air bag when in the deflated condition having a first portion which is turned inside out and received inside a second portion of said air bag, said first portion of said air bag forming said lower section of said air bag when said air bag is in the inflated condition, said first portion of said air bag being the final portion of said air bag to inflate when said air bag is inflated, said air bag comprising a plurality of layers including a back panel disposed farthest from the vehicle occupant when said air bag is inflated and a front panel disposed closest to the vehicle occupant when said air bag is inflated, each of said back panel and said front panel having respective upper and lower portions, said upper portions of said back panel and of said front panel forming said upper section of said air bag when said air bag is inflated, said lower portions of said back panel and of said front panel forming said lower section of said air bag when said air bag is inflated, said first portion of said air bag including said lower portions of said back panel and of said front panel, said air bag having an inflation fluid opening though which inflation fluid is directed to inflate said air bag, said air bag having a first condition in which first and second parts of said air bag are disposed on opposite sides of said inflation fluid opening, said air bag having a second condition in which said first part of said air bag is rolled into a first compact shape and said second part of said air bag is rolled into a second compact shape disposed adjacent to said rolled first part of said air bag for mounting in the vehicle;

wherein a portion of the material of said second part of said air bag is disposed adjacent to said rolled first part of said air bag to form a pocket into which said rolled second part of said air bag is disposed.

8. An inflatable air bag as set forth in claim 7 wherein said second part of said air bag includes an upper end portion of said air bag.

9. An inflatable air bag as set forth in claim 7 further comprising a retainer for connecting said air bag with the vehicle, said retainer defining said inflation fluid opening in said air bag, each one of said first and second parts of said air bag when rolled being disposed at least partially in said retainer.

10. An inflatable air bag as set forth in claim 9 wherein said retainer comprises a box-shaped metal member within which at least portions of said rolled first and second parts of said air bag are disposed when in the second condition, said box-shaped metal member being adapted to be connected with an inflation fluid source for mounting in the vehicle.

11. An inflatable air bag as set forth in claim 7 wherein the portion of said air bag which inflates first is said second part of said air bag, said second part of said air bag unrolling as it inflates, said first part of said air bag unrolling and inflating after said second part of said air bag unrolls and inflates.

12. An inflatable air bag for, when inflated, protecting an occupant of a vehicle, said air bag having a deflated condition and an inflated condition, said air bag when in the inflated condition having upper and lower sections, said air bag when in the deflating condition having a first portion which is turned inside out and received inside a second portion of said air bag, said first portion of said air bag forming said lower section of said air bag when said air bag is in the inflated condition, said first portion of said air bag being the final portion of said air bag to inflate when said air bag is inflated, said air bag including a retainer defining an inflation fluid opening in said air bag through which inflation fluid is directed to inflate said air bag, each of said upper and lower sections of said air bag having side sections folded inward toward said retainer, said air bag having a first condition in which first and second parts of said air bag are disposed on opposite sides of said inflation fluid opening, said air bag having a second condition in which said first part of said air bag is rolled into a first compact shape and said second part of said air bag is rolled into a second compact shape disposed adjacent to said rolled first part of said air bag for mounting in the vehicle;

wherein said retainer comprises a box-shaped metal member within which at least portions of said rolled first and second parts of said air bag are disposed when in the second condition, said box-shaped metal member being adapted to be connected with an inflation fluid source for mounting in the vehicle; and wherein a portion of the material of said second part of said air bag is moved into said retainer adjacent to said rolled first part of said air bag to form a pocket into which said rolled second part of said air bag is disposed.

13. An inflatable air bag as set forth in claim 12 wherein each one of said rolled first and second parts of said air bag is disposed at least partially in said retainer.

14. An inflatable air bag as set forth in claim 12 wherein said second part of said air bag includes an upper end portion of said air bag.

15. An inflatable air bag as set forth in claim 12 wherein the portion of said air bag which inflates first is said second part of said air bag, said second part of said air bag unrolling as it inflates, said first part of said air bag unrolling and inflating after said second part unrolls and inflates.

* * * * *